(12) United States Patent
Larsson et al.

(10) Patent No.: US 9,860,091 B2
(45) Date of Patent: Jan. 2, 2018

(54) TABLE DESIGN FOR 256 QUADRATURE AMPLITUDE MODULATION

(71) Applicant: TELEFONAKTIEBOLAGET LM ERICSSON (PUBL), Stockholm (SE)

(72) Inventors: Daniel Larsson, Stockholm (SE); Jung-Fu Cheng, Fremont, CA (US); Yu Yang, Solna (SE); Meng Wang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/111,220

(22) PCT Filed: Jan. 28, 2015

(86) PCT No.: PCT/IB2015/050657
§ 371 (c)(1),
(2) Date: Jul. 13, 2016

(87) PCT Pub. No.: WO2015/114544
PCT Pub. Date: Aug. 6, 2015

(65) Prior Publication Data
US 2016/0337150 A1   Nov. 17, 2016

Related U.S. Application Data

(60) Provisional application No. 61/933,436, filed on Jan. 30, 2014.

(51) Int. Cl.
*H04L 27/00* (2006.01)
*H04L 1/00* (2006.01)

(52) U.S. Cl.
CPC ........ *H04L 27/0008* (2013.01); *H04L 1/0016* (2013.01); *H04L 1/0025* (2013.01); *H04L 1/0026* (2013.01)

(58) Field of Classification Search
CPC .. H04L 27/0008; H04L 1/0025; H04L 1/0026
See application file for complete search history.

(56) References Cited

U.S. PATENT DOCUMENTS

2008/0188259 A1* 8/2008 Blanz .................. H04B 7/04
                                                    455/522
2009/0245408 A1* 10/2009 Mujtaba .............. H04B 7/0417
                                                    375/267

(Continued)

FOREIGN PATENT DOCUMENTS

GB        2499671 A       8/2013
WO   2013/127303 A1       9/2013

OTHER PUBLICATIONS

ZTE: "Consideration on high order modulation for small cell;" 3GPP draft; R1-130136; 3rd Generation Partnership Project; vol. RAN WG1; St. Julian; Jan. 19, 2013.

(Continued)

*Primary Examiner* — Kenneth Lam

(57) ABSTRACT

According to some embodiments, a method of determining a modulation coding scheme in a wireless network comprises receiving a CQI index, wherein the CQI index comprises a four-bit value associated with a channel quality of a wireless signal and identifying an entry in a CQI table based on the CQI index. The CQI table comprises: a first contiguous plurality of table entries associated with low SINR, each entry based on a first sampling grid; a second contiguous plurality of table entries associated with medium SINR, each entry based on a second sampling grid; and a third contiguous plurality of table entries associated with high SINR, each entry based on a third sampling grid. The method further comprises determining a modulation coding scheme based on the identified entry in the CQI table and encoding a transmission block according to the determined modulation coding scheme.

26 Claims, 15 Drawing Sheets

(56) References Cited

U.S. PATENT DOCUMENTS

| | | | | |
|---|---|---|---|---|
| 2011/0075753 A1* | 3/2011 | Jung | ............... | H04L 1/0003 375/267 |
| 2013/0223255 A1* | 8/2013 | Enescu | ............ | H04W 24/10 370/252 |
| 2014/0169300 A1* | 6/2014 | Kim | ............... | H04L 5/0057 370/329 |
| 2015/0016553 A1* | 1/2015 | Yang | ............... | H04L 1/0016 375/261 |
| 2015/0163773 A1* | 6/2015 | Wang | ............... | H04L 5/0057 370/329 |
| 2015/0358111 A1* | 12/2015 | Marinier | .......... | H04L 1/0003 370/329 |
| 2016/0087752 A1* | 3/2016 | Xia | ............... | H04L 1/0003 370/329 |
| 2016/0211904 A1* | 7/2016 | Kim | ............... | H04L 27/34 |
| 2016/0323855 A1* | 11/2016 | Nakamura | ........ | H04L 1/0003 |

OTHER PUBLICATIONS

Huawei, et al.: "Standard impacts of 256QAM;" 3GPP draft; R1-135033; 3rd Generation Partnership Project; vol. RAN WG1; San Francisco, US; Nov. 1, 2013.

Ericsson: "On standard impacts to support 256QAM in downlink;" 3GPP draft; R1-135655; 3rd Generation Partnership Project; vol. RAN WG1; San Francisco, US; Nov. 13, 2013.

3GPP TS 36.213 V11.2.0; 3rd Generation Partnership Project; Technical Specification Group Radio Access Network; Evolved Universal Terrestrial Radio Access (E-UTRA); Physical layer procedures (Release 11); Feb. 2013.

* cited by examiner

Rel-8 CQI Table

| CQI | Mod | r×1024 | SE |
|---|---|---|---|
| 0 | out of range | | |
| 1 | 2 | 78 | 0.1523 |
| 2 | 2 | 120 | 0.2344 |
| 3 | 2 | 193 | 0.3770 |
| 4 | 2 | 308 | 0.6016 |
| 5 | 2 | 449 | 0.8770 |
| 6 | 2 | 602 | 1.1758 |
| 7 | 4 | 378 | 1.4766 |
| 8 | 4 | 490 | 1.9141 |
| 9 | 4 | 616 | 2.4063 |
| 10 | 6 | 466 | 2.7305 |
| 11 | 6 | 567 | 3.3223 |
| 12 | 6 | 666 | 3.9023 |
| 13 | 6 | 772 | 4.5234 |
| 14 | 6 | 873 | 5.1152 |
| 15 | 6 | 948 | 5.5547 |

Example CQI Table for 256QAM support

| CQI | Mod | r×1024 | SE |
|---|---|---|---|
| 0 | out of range | | |
| 1 | 2 | 120 | 0.2344 |
| 2 | 2 | 251 | 0.4902 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 772 | 4.5234 |
| 12 | 8 | 655 | 5.1172 |
| 13 | 8 | 765 | 5.9766 |
| 14 | 8 | 865 | 6.7578 |
| 15 | 8 | 950 | 7.4219 |

Fig. 4

Rel-8 CQI Table

| CQI | Mod | r×1024 | SE |
|---|---|---|---|
| 0 | | out of range | |
| 1 | 2 | 78 | 0.1523 |
| 2 | 2 | 120 | 0.2344 |
| 3 | 2 | 193 | 0.3770 |
| 4 | 2 | 308 | 0.6016 |
| 5 | 2 | 449 | 0.8770 |
| 6 | 2 | 602 | 1.1758 |
| 7 | 4 | 378 | 1.4766 |
| 8 | 4 | 490 | 1.9141 |
| 9 | 4 | 616 | 2.4063 |
| 10 | 6 | 466 | 2.7305 |
| 11 | 6 | 567 | 3.3223 |
| 12 | 6 | 666 | 3.9023 |
| 13 | 6 | 772 | 4.5234 |
| 14 | 6 | 873 | 5.1152 |
| 15 | 6 | 948 | 5.5547 |

Example CQI Table for 256QAM support

| CQI | Mod | r×1024 | SE |
|---|---|---|---|
| 0 | | out of range | |
| 1 | 2 | 78 | 0.1523 |
| 2 | 2 | 157 | 0.3057 |
| 3 | 2 | 308 | 0.6016 |
| 4 | 2 | 526 | 1.0264 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 772 | 4.5234 |
| 12 | 6 | 873 | 5.1152 |
| 13 | 8 | 744 | 5.8059 |
| 14 | 8 | 831 | 6.4897 |
| 15 | 8 | 911 | 7.1103 |

Fig. 6

Rel-8 PDSCH MCS Table

| MCS | Mod | TBS | Target r×1024 |
|---|---|---|---|
| 0 | 2 | 0 | 120 |
| 1 | 2 | 1 | 157 |
| 2 | 2 | 2 | 193 |
| 3 | 2 | 3 | 251 |
| 4 | 2 | 4 | 308 |
| 5 | 2 | 5 | 379 |
| 6 | 2 | 6 | 449 |
| 7 | 2 | 7 | 526 |
| 8 | 2 | 8 | 602 |
| 9 | 2 | 9 | 679 |
| 10 | 4 | 9 | 340 |
| 11 | 4 | 10 | 378 |
| 12 | 4 | 11 | 434 |
| 13 | 4 | 12 | 490 |
| 14 | 4 | 13 | 553 |
| 15 | 4 | 14 | 616 |
| 16 | 4 | 15 | 658 |
| 17 | 6 | 15 | 438 |
| 18 | 6 | 16 | 466 |
| 19 | 6 | 17 | 517 |
| 20 | 6 | 18 | 567 |
| 21 | 6 | 19 | 616 |
| 22 | 6 | 20 | 666 |
| 23 | 6 | 21 | 719 |
| 24 | 6 | 22 | 772 |
| 25 | 6 | 23 | 822 |
| 26 | 6 | 24 | 873 |
| 27 | 6 | 25 | 910 |
| 28 | 6 | 26 | 1054 |

| MCS | |
|---|---|
| 29 | 2 | reserved |
| 30 | 4 | |
| 31 | 6 | |

Example PDSCH MCS Table for 256QAM support

| MCS | Mod | TBS | Target r×1024 |
|---|---|---|---|
| 0 | 2 | 0 | 120 |
| 1 | 2 | 2 | 193 |
| 2 | 2 | 4 | 308 |
| 3 | 2 | 6 | 449 |
| 4 | 2 | 8 | 602 |
| 5 | 4 | 9 | 340 |
| 6 | 4 | 10 | 378 |
| 7 | 4 | 11 | 434 |
| 8 | 4 | 12 | 490 |
| 9 | 4 | 13 | 553 |
| 10 | 4 | 14 | 616 |
| 11 | 6 | 15 | 438 |
| 12 | 6 | 16 | 466 |
| 13 | 6 | 17 | 517 |
| 14 | 6 | 18 | 567 |
| 15 | 6 | 19 | 616 |
| 16 | 6 | 20 | 666 |
| 17 | 6 | 21 | 719 |
| 18 | 6 | 22 | 772 |
| 19 | 6 | 23 | 822 |
| 20 | 6 | 23 | 822 |
| 21 | 8 | 23 | 617 |
| 22 | 8 | 27 | 664 |
| 23 | 8 | 28 | 718 |
| 24 | 8 | 29 | 770 |
| 25 | 8 | 30 | 820 |
| 26 | 8 | 31 | 867 |
| 27 | 8 | 32 | 912 |
| 28 | 8 | 33 | 950 |
| 29 | mod↑ | reserved | |
| 30 | same | | |
| 31 | mod↓ | | |

Fig. 7

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

Fig. 8

Example PDSCH MCS Table for 256QAM support

| MCS | Mod | TBS | Target r×1024 |
|---|---|---|---|
| 0 | 2 | 0 | 120 |
| 1 | 2 | 2 | 193 |
| 2 | 2 | 4 | 308 |
| 3 | 2 | 6 | 449 |
| 4 | 2 | 8 | 602 |
| 5 | 4 | 9 | 340 |
| 6 | 4 | 10 | 378 |
| 7 | 4 | 11 | 434 |
| 8 | 4 | 12 | 490 |
| 9 | 4 | 13 | 553 |
| 10 | 4 | 14 | 616 |
| 11 | 4 | 15 | 658 |
| 12 | 6 | 15 | 438 |
| 13 | 6 | 16 | 466 |
| 14 | 6 | 17 | 517 |
| 15 | 6 | 18 | 567 |
| 16 | 6 | 19 | 616 |
| 17 | 6 | 20 | 666 |
| 18 | 6 | 21 | 719 |
| 19 | 6 | 22 | 772 |
| 20 | 6 | 23 | 822 |
| 21 | 8 | 23 | 617 |
| 22 | 8 | 24 | 655 |
| 23 | 8 | 27 | 711 |
| 24 | 8 | 28 | 765 |
| 25 | 8 | 29 | 817 |
| 26 | 8 | 30 | 865 |
| 27 | 8 | 31 | 911 |
| 28 | 8 | 32 | 950 |
| 29 | mod↑ | reserved | |
| 30 | same | | |
| 31 | mod↓ | | |

Rel-8 PDSCH MCS Table

| MCS | Mod | TBS | Target r×1024 |
|---|---|---|---|
| 0 | 2 | 0 | 120 |
| 1 | 2 | 1 | 157 |
| 2 | 2 | 2 | 193 |
| 3 | 2 | 3 | 251 |
| 4 | 2 | 4 | 308 |
| 5 | 2 | 5 | 379 |
| 6 | 2 | 6 | 449 |
| 7 | 2 | 7 | 526 |
| 8 | 2 | 8 | 602 |
| 9 | 2 | 9 | 679 |
| 10 | 4 | 9 | 340 |
| 11 | 4 | 10 | 378 |
| 12 | 4 | 11 | 434 |
| 13 | 4 | 12 | 490 |
| 14 | 4 | 13 | 553 |
| 15 | 4 | 14 | 616 |
| 16 | 4 | 15 | 658 |
| 17 | 6 | 15 | 438 |
| 18 | 6 | 16 | 466 |
| 19 | 6 | 17 | 517 |
| 20 | 6 | 18 | 567 |
| 21 | 6 | 19 | 616 |
| 22 | 6 | 20 | 666 |
| 23 | 6 | 21 | 719 |
| 24 | 6 | 22 | 772 |
| 25 | 6 | 23 | 822 |
| 26 | 6 | 24 | 873 |
| 27 | 6 | 25 | 910 |
| 28 | 6 | 26 | 1054 |

| | reserved |
|---|---|
| 29 | 2 |
| 30 | 4 |
| 31 | 6 |

Fig. 9

Example PDSCH MCS Table for 256QAM support

| MCS | Mod | TBS | Target r×1024 |
|---|---|---|---|
| 0 | 2 | 0 | 120 |
| 1 | 2 | 2 | 193 |
| 2 | 2 | 4 | 308 |
| 3 | 2 | 6 | 449 |
| 4 | 4 | 8 | 602 |
| 5 | 4 | 9 | 679 |
| 6 | 4 | 9 | 340 |
| 7 | 4 | 10 | 378 |
| 8 | 4 | 11 | 434 |
| 9 | 4 | 12 | 490 |
| 10 | 4 | 13 | 553 |
| 11 | 4 | 14 | 616 |
| 12 | 4 | 15 | 658 |
| 13 | 6 | 15 | 438 |
| 14 | 6 | 16 | 466 |
| 15 | 6 | 17 | 517 |
| 16 | 6 | 18 | 567 |
| 17 | 6 | 19 | 616 |
| 18 | 6 | 20 | 666 |
| 19 | 6 | 21 | 719 |
| 20 | 6 | 22 | 772 |
| 21 | 6 | 23 | 822 |
| 22 | 6 | 24 | 873 |
| 23 | 8 | 25 | 683 |
| 24 | 8 | 27 | 744 |
| 25 | 8 | 26 | 790 |
| 26 | 8 | 28 | 831 |
| 27 | 8 | 29 | 871 |
| 28 | 8 | 30 | 911 |
| 29 | modf | reserved | |
| 30 | same | | |
| 31 | mod↓ | | |

Rel-8 PDSCH MCS Table

| MCS | Mod | TBS | Target r×1024 |
|---|---|---|---|
| 0 | 2 | 0 | 120 |
| 1 | 2 | 1 | 157 |
| 2 | 2 | 2 | 193 |
| 3 | 2 | 3 | 251 |
| 4 | 2 | 4 | 308 |
| 5 | 2 | 5 | 379 |
| 6 | 2 | 6 | 449 |
| 7 | 2 | 7 | 526 |
| 8 | 2 | 8 | 602 |
| 9 | 2 | 9 | 679 |
| 10 | 4 | 9 | 340 |
| 11 | 4 | 10 | 378 |
| 12 | 4 | 11 | 434 |
| 13 | 4 | 12 | 490 |
| 14 | 4 | 13 | 553 |
| 15 | 4 | 14 | 616 |
| 16 | 4 | 15 | 658 |
| 17 | 6 | 15 | 438 |
| 18 | 6 | 16 | 466 |
| 19 | 6 | 17 | 517 |
| 20 | 6 | 18 | 567 |
| 21 | 6 | 19 | 616 |
| 22 | 6 | 20 | 666 |
| 23 | 6 | 21 | 719 |
| 24 | 6 | 22 | 772 |
| 25 | 6 | 23 | 822 |
| 26 | 6 | 24 | 873 |
| 27 | 6 | 25 | 910 |
| 28 | 6 | 26 | 1054 |

| 29 | 2 | reserved |
|---|---|---|
| 30 | 4 | |
| 31 | 6 | |

Fig. 10

| MCS | Mod | TBS | Target r×1024 | CQI |
|---|---|---|---|---|
| 0 | | | | |
| | 2 | 0 | 120 | 1 |
| 1 | | | | |
| | 2 | 3 | 251 | 2 |
| 2 | | | | |
| | 2 | 6 | 449 | 3 |
| 3 | 4 | 9 | 340 | 4 |
| 4 | 4 | 10 | 378 | |
| 5 | 4 | 11 | 434 | 5 |
| 6 | 4 | 12 | 490 | |
| 7 | 4 | 13 | 553 | 6 |
| 8 | 4 | 14 | 616 | |
| 9 | 4 | 15 | 658 | 7 |
| 10 | 6 | 15 | 458 | |
| 11 | 6 | 16 | 466 | |
| 12 | 6 | 17 | 517 | 8 |
| 13 | 6 | 18 | 567 | |
| 14 | 6 | 19 | 616 | 9 |
| 15 | 6 | 20 | 666 | |
| 16 | 6 | 21 | 719 | 10 |
| 17 | 6 | 22 | 772 | |
| 18 | 6 | 23 | 822 | 11 |
| 19 | 8 | 23 | 611 | |
| 20 | 8 | 24 | 655 | |
| 21 | 8 | 27 | 702 | 12 |
| 22 | 8 | 28 | 748 | |
| 23 | 8 | 26 | 792 | 13 |
| 24 | 8 | 29 | 837 | |
| 25 | 8 | 30 | 879 | 14 |
| 26 | 8 | 31 | 918 | |
| 27 | 8 | 32 | 952 | 15 |
| 28 | 2 | reserved | | |
| 29 | 4 | reserved | | |
| 30 | 6 | reserved | | |
| 31 | 8 | reserved | | |

| MCS | Mod | TBS | Target r×1024 |
|---|---|---|---|
| 0 | 2 | 0 | 120 |
| 1 | 2 | 1 | 157 |
| 2 | 2 | 2 | 193 |
| 3 | 2 | 3 | 251 |
| 4 | 2 | 4 | 308 |
| 5 | 2 | 5 | 379 |
| 6 | 2 | 6 | 449 |
| 7 | 2 | 7 | 526 |
| 8 | 2 | 8 | 602 |
| 9 | 2 | 9 | 679 |
| 10 | 4 | 9 | 340 |
| 11 | 4 | 10 | 378 |
| 12 | 4 | 11 | 434 |
| 13 | 4 | 12 | 490 |
| 14 | 4 | 13 | 553 |
| 15 | 4 | 14 | 616 |
| 16 | 4 | 15 | 658 |
| 17 | 6 | 15 | 438 |
| 18 | 6 | 16 | 466 |
| 19 | 6 | 17 | 517 |
| 20 | 6 | 18 | 567 |
| 21 | 6 | 19 | 616 |
| 22 | 6 | 20 | 666 |
| 23 | 6 | 21 | 719 |
| 24 | 6 | 22 | 772 |
| 25 | 6 | 23 | 822 |
| 26 | 6 | 24 | 873 |
| 27 | 6 | 25 | 910 |
| 28 | 6 | 26 | 1054 |
| 29 | 2 | | |
| 30 | 4 | | |
| 31 | 6 | | |

Fig. 11

TABLE DESIGN FOR 256 QUADRATURE AMPLITUDE MODULATION

TECHNICAL FIELD

Particular embodiments relate generally to link adaptation in wireless communications, and more particularly to Channel Quality Indication (CQI)/Modulation Coding Scheme (MCS)/Transport Block Size (TBS) table design for 256 Quadrature Amplitude Modulation (256QAM).

BACKGROUND

Link adaptation is a component of channel-dependent scheduling in Long Term Evolution (LTE) systems. Link adaptation dynamically adjusts a transmitted information data rate (modulation and coding rate) to match channel conditions for each user. Current LTE systems, in both downlink and uplink, support three modulation schemes. These include Quadrature Phase-Shift Keying (QPSK), 16 Quadrature Amplitude Modulation (16QAM) and 64 Quadrature Amplitude Modulation (64QAM), corresponding to two, four and six bits per modulation symbol, respectively.

Low-order modulation (e.g., QPSK) is robust in that it tolerates a relatively high level of noise and interference, but provides a relatively low bit rate. In contrast, high-order modulation (e.g., 64QAM) provides a relatively high data rate but is more sensitive to noise and interference. Thus, high-order modulation is typically adopted when the signal to interference plus noise ratio (SINR) is sufficiently high. When a modulation scheme is determined, a coding rate is also chosen. The coding rate also depends on channel conditions. A lower code rate is used for lower SINR and higher code rate for higher SINR.

In LTE, a User Equipment (UE) reports Channel Quality Indication (CQI) to assist an eNB in determining an appropriate Modulation and Coding Scheme (MCS) for downlink transmission. Typically, CQI are derived from UE measurements on downlink reference signals. The reported CQI represents the highest MCS that is supported for a Physical Downlink Shared Channel (PDSCH) transmission with a transport block error rate probability not exceeding ten percent. CQI may be signaled to the eNB by the means of a CQI index which indexes a CQI table, such as Table 1. A 4-bit CQI value corresponds to one of the 16 combinations of modulation scheme and coding rate in the CQI table.

TABLE 1

CQI index table for PDSCH transmission (Table 7.2.3-1 in 3GPP TS 36.213 V11.2.0)

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |

TABLE 1-continued

CQI index table for PDSCH transmission (Table 7.2.3-1 in 3GPP TS 36.213 V11.2.0)

| CQI index | modulation | code rate × 1024 | efficiency |
|---|---|---|---|
| 14 | 64QAM | 873 | 5.1152 |
| 15 | 64QAM | 948 | 5.5547 |

Generally, the modulation schemes and code rates for CQI entries are determined by sampling with approximately 2 dB spacing in the symbol information curves as shown in FIG. 1, where each sampling point matches a corresponding CQI index in the table.

FIG. 1 is a graph that illustrates example symbol information curves for various modulation schemes. The vertical axis represents the modulation bits per symbol and the horizontal axis represents the SINR. The circles numbered 1-15 represent the sampling intervals for the three modulation schemes. Sampling intervals 1-6 coincide with the QPSK symbol information curve, sampling intervals 7-9 coincide with the 16QAM symbol information curve, and sampling intervals 10-15 coincide with the 64QAM symbol information curve.

For downlink data transmission, an eNB typically selects an MCS depending on predicted downlink channel conditions, taking into account CQI feedback. To optimize link adaptation, signaling mechanisms may communicate information between an eNB and a UE. Knowledge of the MCS adopted for PDSCH transmission is indicated by a five-bit field in the Downlink Control Information (DCI). This MCS field corresponds to an index into an MCS table, such as Table 2.

TABLE 2

MCS index table for PDSCH transmission (Table 7.1.7.1-1 in 3GPP TS 36.213 V11.2.0)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

TABLE 2-continued

MCS index table for PDSCH transmission (Table 7.1.7.1-1 in 3GPP TS 36.213 V11.2.0)

| MCS Index $I_{MCS}$ | Modulation Order $Q_m$ | TBS Index $I_{TBS}$ |
|---|---|---|
| 29 | 2 | reserved |
| 30 | 4 | |
| 31 | 6 | |

In Table 2, twenty-nine of the thirty-two combinations are used to signal an MCS. The MCS, together with a number of resource blocks, determines the transmit block size (TBS) on the Downlink Shared Channel (DL-SCH). All TBSs can be described by mapping the TBS index, $I_{TBS}$, and an allocation bandwidth into the corresponding transport block size (in bits) in the TBS table (i.e. Table 7.1.7.2.1-1 in 3GPP TS 36.213 V11.2.0) with 27 rows and 110 columns (maximum bandwidth of 110 resource blocks).

The remaining three entries in Table 2, entries 29-31, are reserved for Hybrid Automatic Repeat Request (HARQ) retransmission. For a retransmission, the TBS remains the same size as in the original transmission and the associated modulation scheme can be adjusted according to the reserved MCS index.

In LTE scenarios with high SINR, such as small cell environments with terminals close to the serving eNB, providing higher data rate with given transmission bandwidth may be achieved with a higher order modulation that carries more bits of information per modulation symbol. For example, 256 Quadrature Amplitude Modulation (256QAM) transmits 8 bits per modulation symbol, which can improve the peak data rate maximum by thirty-three percent as shown in FIG. 2. 256QAM, however, only provides gains when the SINR is sufficiently high. Additionally, current LTE CQI/MCS/TBS tables do not support 256QAM.

SUMMARY

According to some embodiments, a method of determining a modulation coding scheme in a wireless network comprises receiving a CQI index, wherein the CQI index comprises a four-bit value associated with a channel quality of a wireless signal, and identifying an entry in a CQI table based on the CQI index. The CQI table comprises: a first contiguous plurality of table entries associated with low SINR, each entry based on a first sampling grid; a second contiguous plurality of table entries associated with medium SINR, each entry based on a second sampling grid; and a third contiguous plurality of table entries associated with high SINR, each entry based on a third sampling grid. The method further comprises determining a modulation coding scheme based on the identified entry in the first CQI table and encoding a transmission block according to the determined modulation coding scheme.

In particular embodiments, the first sampling grid comprises a grid separated by approximately 3 dB, the second sampling grid comprises a grid separated by approximately 2 dB, and the third sampling grid comprises a grid separated by approximately 2.5 dB.

In particular embodiments, the first contiguous plurality of table entries comprises QPSK entries, the second contiguous plurality of table entries comprises 16QAM entries, and the third contiguous plurality of table entries comprises 64QAM entries and 256QAM entries.

According to some embodiments, a method of determining an MCS index in a wireless network comprises receiving a CQI index. The CQI index comprises a four-bit value associated with a channel quality of a wireless signal. The method further comprises determining an MCS and a TBS based at least in part on the received CQI index and identifying an entry in an MCS table based on the determined MCS. The MCS table comprises a first contiguous plurality of table entries associated with low SINR, each entry based on a first sampling grid; a second contiguous plurality of table entries associated with medium SINR, each entry based on a second sampling grid; and a third contiguous plurality of table entries associated with high SINR, each entry based on a third sampling grid. The method further comprises determining an MCS index. The MCS index comprises a five-bit value associated with the identified entry in the MCS table.

In particular embodiments, the first contiguous plurality of table entries comprises QPSK entries, the second contiguous plurality of table entries comprises 16QAM entries, and the third contiguous plurality of table entries comprises 64QAM entries and 256QAM entries.

According to some embodiments, a method of determining an MCS in a wireless network comprises receiving an MCS index. The MCS index comprises a five-bit value associated with an entry in an MCS table. The method further comprises identifying an entry in the MCS table based on the received MCS index. The MCS table comprises a first contiguous plurality of table entries associated with low SINR, each entry based on a first sampling grid; a second contiguous plurality of table entries associated with medium SINR, each entry based on a second sampling grid; and a third contiguous plurality of table entries associated with high SINR, each entry based on a third sampling grid. The method further comprises determining an MCS based on the identified entry in the MCS table.

Particular embodiments may exhibit some of the following technical advantages. Particular embodiments may efficiently support 256QAM without increasing the size of existing CQI/MCS tables or compromising the link adaptation performance of existing modulation schemes. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which:

FIG. 4 is an example CQI table for 256QAM, according to a particular embodiment;

FIG. 6 is another example CQI table, according to a particular embodiment;

FIG. 7 is an example MCS table for 256QAM, according to a particular embodiment;

FIG. 8 is a table showing example transport block sizes for voice over IP (VoIP);

FIGS. 9-11 are additional examples of an MCS table for 256QAM, according to some embodiments;

DETAILED DESCRIPTION

Figure 1:
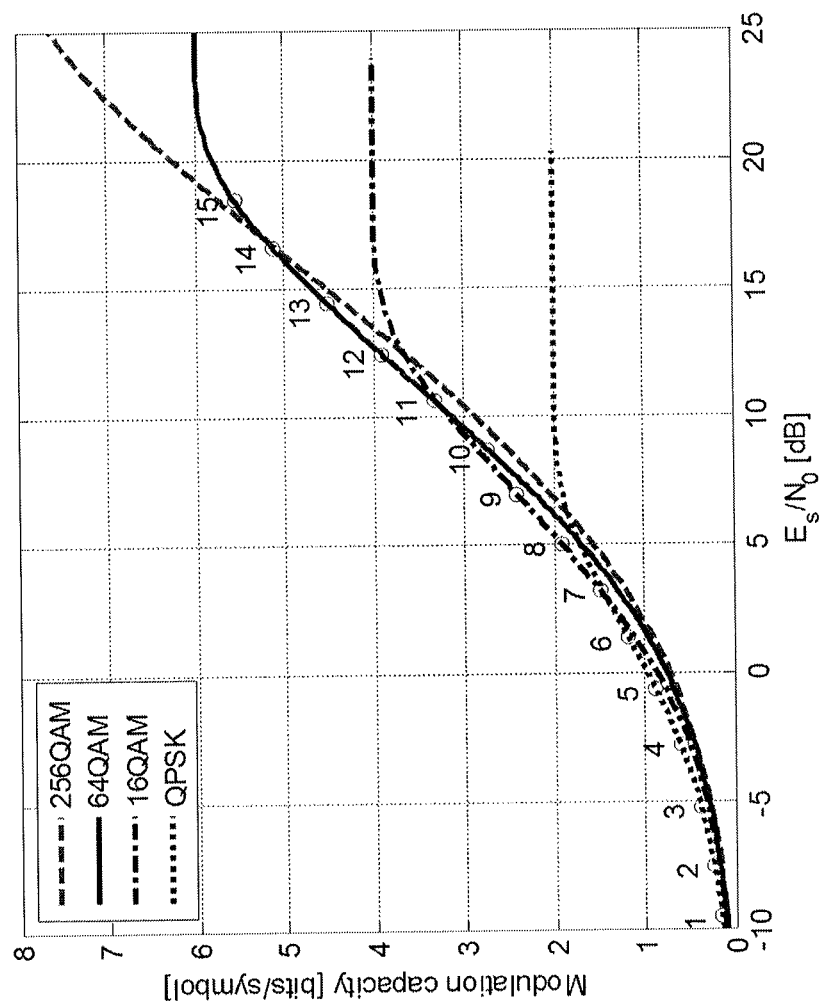
FIG. 1 is a graph that illustrates example symbol information curves for various modulation schemes.
Figure 2:
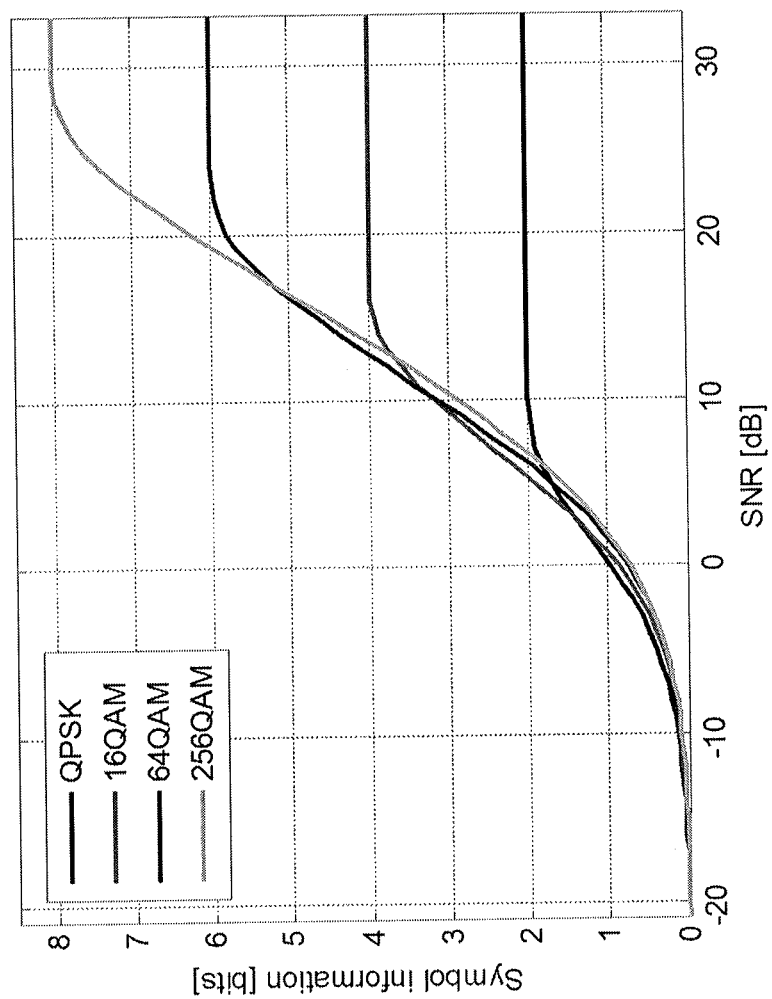
FIG. 2 is a graph that illustrates example bit information for various modulation schemes at various signal to noise levels.

Current LTE systems support three modulation schemes: QPSK, 16QAM and 64QAM. To support 256QAM, eNBs and UEs may use CQI/MCS/TBS tables that include entries to cover a higher SINR region for 256QAM. Because of the inflexibility of DCI (and Uplink Control Information (UCI)) formats in LTE, advantages may be realized by maintaining the current size of CQI and MCS tables. Thus, the design of CQI/MCS/TBS tables may include 256QAM while not compromising link adaptation performance of existing modulation schemes.

Some alternative table designs for 256QAM may include particular disadvantages. For example, one alternative is to use the equidistance sampling principle used in the current tables, but extend it to a larger SINR range to cover the operating SINR region of 256QAM. A disadvantage of this alternative is decreased resolution of the table which may affect link adaptation and system performance.

Another alternative is to shift the SINR range to cover medium and high SINR regions to support 256QAM with a good resolution at medium to high SINR. A disadvantage of this alternative is sacrificed robustness at low SINR.

Another alternative may be to use 256QAM tables when 256QAM capable UEs experience good SINR, and fall back to conventional tables for low SINR scenarios. This alternative, however, may adversely impact the mobility performance of a UE. For example, if the network is not able to reconfigure conventional tables quickly enough, then a UE may experience radio link failure at the low SINR scenarios. In addition, configuring the tables according to operational scenarios (e.g., based on current SINR) may adversely affect the scheduling flexibility.

An object of the present disclosure is to obviate at least these disadvantages and provide improved methods to support 256QAM with existing table sizes. This disclosure describes control signaling in LTE that supports 256QAM for link adaptation. In addition to existing modulation schemes, the disclosed embodiments support 256QAM within the current CQI/MCS table sizes. A particular advantage is that the number of bits in the DCI/UCI formats may remain the same. Additionally, many of the current CQI/MCS table entries may be retained, particularly for 16QAM and 64QAM. This may facilitate compatible operation with current implementations. In particular embodiments, QPSK entries may be reused or removed by down-sampling the low SINR region with the lowest QPSK entry as an anchor point.

In particular embodiments, an offset mechanism may be used in the reserved part of the MCS table such that 256QAM together with other modulation schemes may be used in retransmissions. In particular embodiments, the additional TBS indices in the MCS table may correspond to additional TBS rows designed for 256QAM TBS across all bandwidths in the TBS table.

In particular embodiments, an MCS design that accounts for particular transport block sizes used for VoIP may have particular advantages. For example, if the particular VoIP transport block sizes are not accessible by the 256QAM MCS table, then VoIP calls may experience greater overhead.

A particular advantage of the disclosed embodiments is that LTE link adaption may benefit from 256QAM, which may improve spectral efficiency in high SINR scenarios. Furthermore, the disclosed embodiments may benefit from the same RRC and VoIP robustness as previous implementations.

Particular embodiments are described with reference to FIGS. 1-17 of the drawings, like numerals being used for like and corresponding parts of the various drawings. LTE is used throughout this disclosure as an example cellular system, but the ideas presented herein apply to any wireless communication system.

Figure 3:
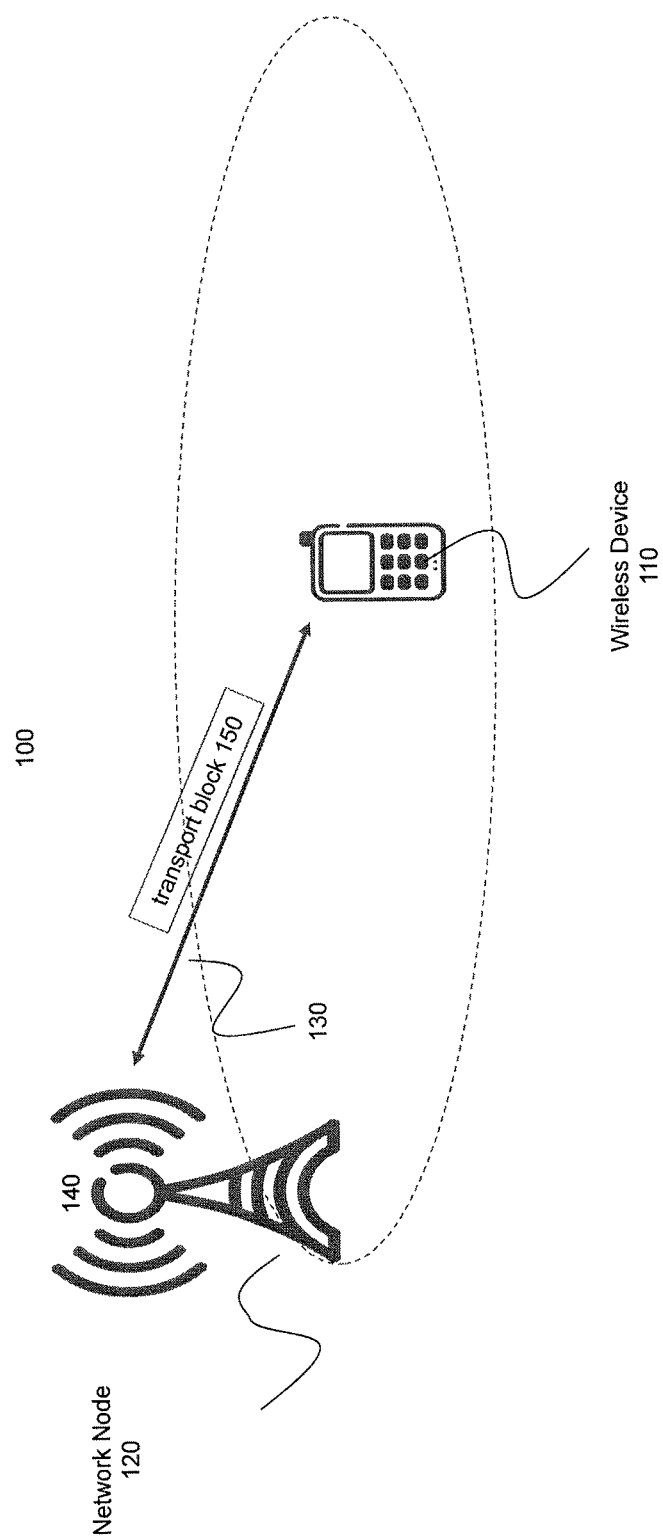
FIG. 3 is a block diagram illustrating an example of a wireless network, according to some embodiments.

FIG. 3 is a block diagram illustrating an example of a wireless network, according to some embodiments. Network 100 radio network node 120 (such as a base station or eNodeB) and wireless devices 110 (such as mobile phones, smart phones, laptop computers, tablet computers, or any other devices that can provide wireless communication). In general, wireless devices 110 that are within coverage of radio network node 120 communicate with radio network node 120 by transmitting and receiving wireless signals 130. For example, wireless devices 110 and radio network node 120 may communicate wireless signals 130 containing voice traffic, data traffic, and/or control signals. Wireless signals 130 may include both downlink transmissions (from radio network node 120 to wireless devices 110) and uplink transmissions (from wireless devices 110 to radio network node 120). In the physical layer, wireless signals 130 may comprise transport blocks 150.

Transport blocks 150 may be modulated according to various modulation schemes such as QPSK, 16QAM, 64QAM, 256QAM or any other suitable modulation scheme. The modulation scheme of transport block 150 may vary over time according to radio conditions. For example, radio network node 120 may modulate transport block 150 with a higher order modulation scheme (e.g., 256QAM) under favorable radio conditions or may modulate transport block 150 with a lower order modulation scheme (e.g., 16QAM) under less favorable radio conditions.

Radio network node 120 transmits and receives wireless signals 130 using antenna 140. In particular embodiments, radio network node 120 may comprise multiple antennas 140. For example, radio network node 120 may comprise a multi-input multi-output (MIMO) system with two, four, or eight antennas 140.

In network 100, each radio network node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 15 below. Similarly, a radio network node may include any suitable combination of hardware and/or software. For example, in particular embodiments, a radio network node, such as radio network node 120, may include the components described with respect to FIG. 16 below.

FIG. 4 is an example CQI table for 256QAM, according to a particular embodiment. To support 256QAM, wireless devices and radio network nodes may use a 256QAM-capable CQI table. To avoid modifying the UCI format, the 256QAM CQI table may be the same table size as the CQI table in Table 1 (and reproduced in FIG. 4). To include 256QAM entries, some previous entries (e.g., the ones for low SINR) may be removed from the table. Other table entries may be preserved for maintaining link adaptation performance in corresponding SINR regions.

In particular embodiments, low SINR region QPSK entries may be obtained by re-using some existing QPSK entries and then down-sampling the rest of the SNR region. In particular embodiments, for example, down-sampling may include a sampling grid of around 3 dB. Particular embodiments may down-sample with any suitable spacing.

As a particular example, some embodiments may preserve TBS index 0 from the Rel-8 MCS table to maintain the same RRC/VoIP robustness, and thus the Rel-8 CQI entry 2 may be retained accordingly (as illustrated by the first shaded entry in FIG. 4).

As another example, some embodiments may preserve at least three entries for QPSK in the low SINR region. Other embodiments may preserve any suitable number of QPSK entries to adequately cover the low SINR region.

As another example, some embodiments may preserve three entries in the medium SINR region for 16QAM from the Rel-8 CQI table to maintain the resolution and link adaptation performance in this region. Other embodiments may preserve any suitable number of 16QAM entries to adequately cover the medium SINR region.

According to some embodiments, in the high SINR region, the 256QAM entries are obtained by equally sampling the SINR region with a spacing of, for example, 2.5 dB. At the same SNR, the highest 64QAM entry (entries) in Rel-8 CQI table may be replaced by the corresponding 256QAM entry (entries) if its spectral efficiency is lower than its 256QAM counterpart.

Figure 5:
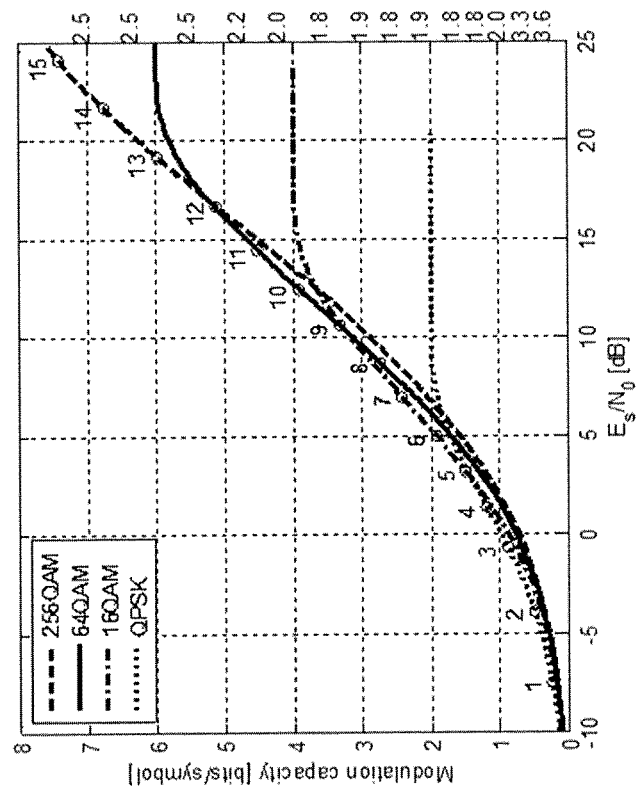
FIG. 5 is a graph that illustrates example SINR sampling intervals, according to some embodiments.

In the example CQI table of FIG. 3, shaded entries in the 256QAM CQI table represent entries that are preserved from the Rel-8 CQI table. In the lower QPSK region, for example, Rel-8 CQI entry 2 is preserved. The lower region is down-sampled to 3 dB spacing to create spare CQI entries for the 256QAM region. In this example, Rel-8 CQI entries 3 and 4 are replaced with a new CQI at their average. Rel-8 CQI entries 5-13 are unchanged. CQI entry 14 in Rel-8 CQI table is changed to 256QAM at the same spectral efficiency. Three new CQI values cover equal SNR spacing between the Rel-8 CQI entry 14 rate and the highest 256QAM rate at 8*0.928. FIG. 5 illustrates an example of the sampling procedure described above for creating a 256QAM CQI table.

FIG. 5 is a graph that illustrates example SINR sampling intervals, according to some embodiments. The vertical axis represents the modulation bits per symbol and the horizontal axis represents the SINR. The circles numbered 1-15 represent the sampling intervals for the four modulation schemes. Sampling intervals 1-4 coincide with the QPSK symbol information curve, sampling intervals 5-7 coincide with the 16QAM symbol information curve, sampling intervals 8-11 coincide with the 64QAM symbol information curve, and sampling intervals 12-15 coincide with the 256QAM symbol information curve.

In some embodiments, a radio network node and/or a wireless device may be configured to revert to a previous CQI table under particular conditions. For example, when the lowest CQI index is selected in the 256QAM CQI table, variations in channel quality or other issues may make support for high order modulation difficult. If the lowest CQI is selected for a period longer than a predetermined period, or if the lowest CQI is selected consecutively for more than a predetermined number of times, then the radio network node and the wireless device may be configured to fall back to the Rel-8 CQI table for more reliable communication. In another example, using the lowest CQI may be extended to use all QPSK CQIs.

FIG. 6 is another example CQI table for 256QAM, according to a particular embodiment. Similar to FIG. 4, shaded entries in the 256QAM CQI table represent entries that are preserved from the Rel-8 CQI table. Other entries may contain different code rates and spectral efficiencies than those illustrated in FIG. 4.

FIG. 7 is an example MCS table for 256QAM, according to a particular embodiment. Similar to the Rel-8 MCS table (reproduced in FIG. 7), the 256QAM MCS table has twenty-eight MCS entries and three entries reserved for retransmission.

In particular embodiments, the retransmission procedure may use any one of the four modulation schemes. As shown for entries 29-31, a relative offset mechanism may adjust the retransmission modulation scheme. In this example, index 29 indicates that retransmission will use the next higher modulation than the original transmission. For example, 16QAM is used for retransmission if QPSK was used in the original transmission. Index 30 indicates that retransmission will use the same modulation as the original transmission. Index 31 indicates that retransmission will use the next lower modulation than the original transmission.

In particular embodiments, the meaning of the last three indices may depend on the originally scheduled modulation order. The above order may, for example, apply if the originally scheduled modulation order is either 16QAM or 64QAM. If instead the originally scheduled modulation order is 256QAM, then index 29 may indicate that retransmission will use the second next lower modulation than the original transmission. For example, 16QAM is used for retransmission if 256QAM was used in the original transmission. Index 30 indicates that retransmission may use the same modulation scheme as the original transmission. Index 31 indicates that retransmission may use the next lower modulation scheme than the original transmission.

Similarly, if QPSK was the originally scheduled modulation order, then index 29 may indicate that retransmission will use the next higher modulation than the original transmission. For example, 16QAM will be used if QPSK was used in the original transmission. Index 30 may indicate that retransmission will use the same modulation scheme as the original transmission. Index 31 may indicate that retransmission will use the second next higher modulation scheme than the original transmission.

One of skill in the art will understand from the above examples that the meaning of the different indices may be relative and may vary based on other conditions. Particular embodiments may include any suitable behavior or relationship in addition to those listed above.

In particular embodiments, one of the last three indices may be fixed to mean QPSK so that a radio network node may schedule a wireless device independent of any particular radio quality. The remaining two indices may indicate that the wireless device should assume it is scheduled with the same modulation order or one modulation order higher. In particular embodiments, if 256QAM was scheduled in the original transmission then the remaining two indices may indicate that the wireless device is scheduled with the same modulation order or one lower.

Similar to the 256QAM CQI table, the low SINR region of the 256QAM MCS table may be down-sampled to create spare MCS entries for 256QAM. In one example, TBS index 0 in the Rel-8 MCS table (i.e., the first entry in Rel-8 MCS table) is preserved to maintain the same RRC/VoIP robustness. In another example, at least three entries may be used for QPSK.

In particular embodiments, the entries for the medium SINR region from the Rel-8 MCS table are preserved for good resolution in the 256QAM MCS table. In one example, all of the 16QAM entries are preserved. In particular embodiments, in the high SINR region, the entries for 256QAM may be obtained by sampling with equal spacing.

In the example MCS table of FIG. 7, shaded entries in the 256QAM MCS table represent entries that are preserved from the Rel-8 MCS table. For example, in the lower QPSK region, MCS entries 0, 3, 6 and 9 are preserved, which is equivalent to a 2 dB sampling space. Rel-8 MCS entries 9-26 are unchanged. MCS entry 27 is modified to be 256QAM and an extra seven entries for 256QAM are added, of which six new entries contain six new TBS indices 27-32 in the MCS table. The new TBS indices correspond to six new TBS rows with new TBS values (across all bandwidths) that may attach to the current TBS table.

In particular embodiments, the 256QAM MCS table may apply to all DCI formats. In particular embodiments, the 256QAM MCS table may only apply for specific DCI formats, RNTI(s), or search spaces. The dependence on DCI format may be independent of whether a wireless device is configured to report CQI feedback based on a 256QAM CQI table. A particular advantage is that the radio network node scheduler may have access to all the low code rates if a wireless device moves into a bad coverage area. In addition, such embodiments may be backwards compatible because certain transmissions from radio network nodes may need to be received by multiple wireless devices and further the radio network node may not know the capability of the wireless device at the time of scheduling.

As an example, the 256QAM MCS table may be used for DCI formats in a wireless device's specific search space, while the Rel-8 MCS table may be used for the DCI formats transmitted in the common search space.

As another example, the 256QAM MCS table may be used with DCI formats that have a CRC that is scrambled with the C-RNTI (i.e., for DCI format that is associated with the C-RNTI). For other RNTI(s), such as for example SI-RNTI, RA-RNTI, TC-RNTI and P-RNTI, the Rel-8 MCS table may be used.

As another example, specific DCI format(s) may be used with the 256QAM MCS table. These DCI formats may be, for example, the DCI formats that are specific for all transmission modes (i.e., DCI formats 1, 1B, 1D, 2, 2A, 2B, 2C and 2D). For the DCI formats that a wireless device monitors independent from the configured transmission mode (i.e., DCI formats 1A and 1C), the wireless device may use the Rel-8 MCS table.

LTE is a wireless packet data communication system. Voice over Internet Protocol (VoIP) technology supports voice applications. Voice encoded packets have a range of transport sizes that have been specifically designed and supported in LTE. These transport block sizes are shown in the shaded entries of FIG. 8.

FIG. 8 is a table showing example transport block sizes for VoIP. The table rows represent a TBS index and the columns represent a number of physical resource blocks. The shaded entries represent entries that may be used by VoIP applications.

Particular embodiments, such as the 256QAM MCS table illustrated in FIG. 7, may support some of the VoIP transport block sizes. Particular embodiments, such as the 256QAM MCS table illustrated in FIG. 9, may support additional VoIP transport block sizes.

FIGS. 9-11 are additional examples of an MCS table for 256QAM, according to some embodiments. Similar to FIG. 8, shaded entries in the 256QAM MCS tables represent entries that are preserved from the Rel-8 MCS table. Other entries may contain different values than those illustrated in FIG. 8.

Figure 12:
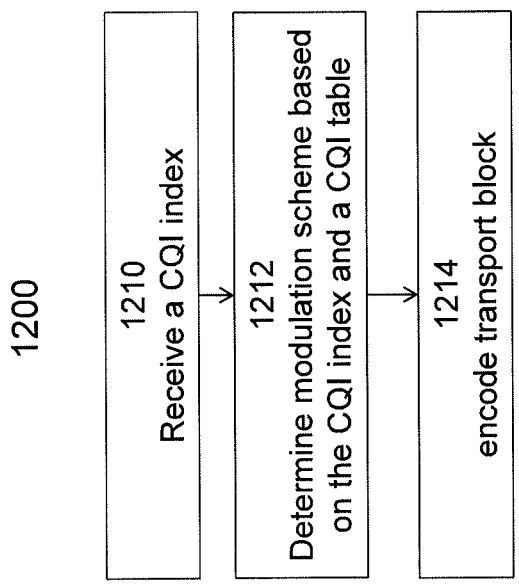
FIG. 12 is a flowchart of an example method of determining a modulation coding scheme in a wireless network, according to some embodiments.

FIG. 12 is a flowchart of an example method of determining a modulation coding scheme in a wireless network, according to some embodiments. In particular embodiments, one or more steps of method 1200 may be performed by components of network 100 described with reference to FIGS. 1-11.

The method begins at step 1210, where a CQI index is received. In particular embodiments, radio network node 120 may receive a CQI index from wireless device 110. For example, wireless device 110 may determine the signal quality from radio network node 120 is good and may transmit a CQI index value of 14 to radio network node 120. The CQI index may be received via signaling or any other suitable communication method between wireless device 110 and radio network node 120. In particular embodiments, the CQI index comprises four bits.

At step 1212, a modulation scheme and coding rate are determined based on the CQI index and a CQI table. In particular embodiments, radio network node 120 may look up an entry in a 256QAM CQI table based on the received CQI index. For example, radio network node 120 may look up entry 14 in the 256QAM CQI table illustrated in FIG. 4. From the table, radio network node 120 may determine that it should use an 8 bit modulation scheme, such as 256QAM, and a coding rate of 865×1024. Particular embodiments may use other CQI tables, such as the 256QAM CQI table illustrated in FIG. 6, or any other suitable CQI table.

At step 1214, the radio network node encodes a transmission block according to the determined modulation scheme and coding rate. For example, radio network node 120 may encode a transmission block using 256QAM and a coding rate of 865×1024.

Modifications, additions, or omissions may be made to method 1200. Additionally, one or more steps in method 1200 of FIG. 12 may be performed in parallel or in any suitable order.

Figures 13A, 13B:
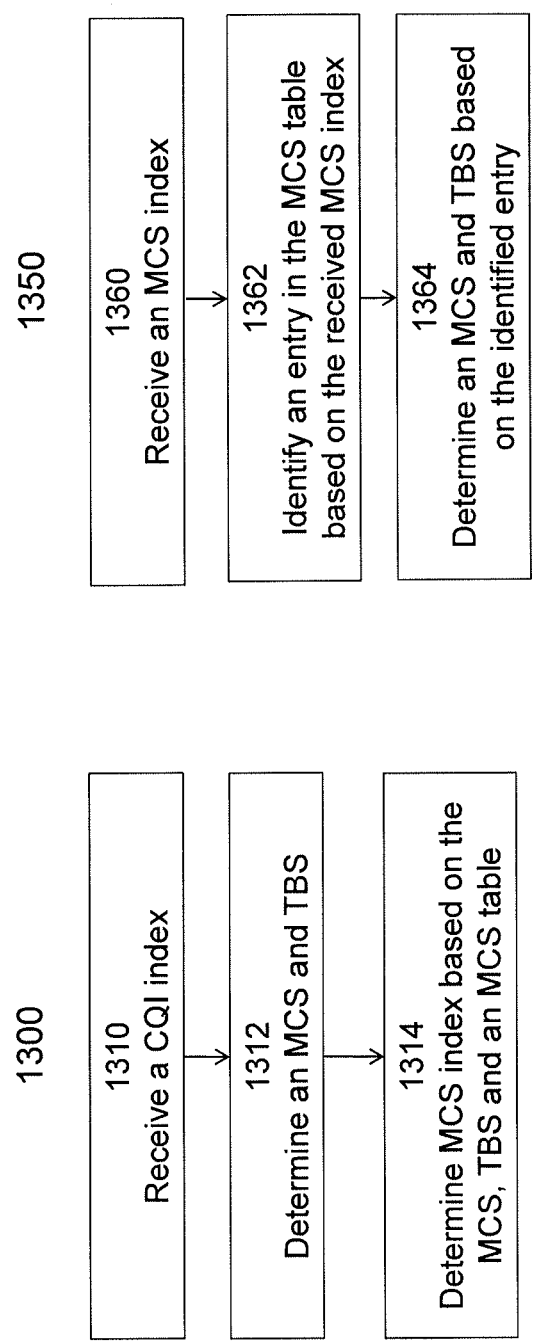
FIG. 13A is a flowchart of an example method in a network node of determining an MCS index, according to some embodiments.
FIG. 13B is a flowchart of an example method in a wireless device of determining an MCS and TBS, according to some embodiments.

FIG. 13A is a flowchart of an example method in a network node of determining an MCS index, according to some embodiments. In particular embodiments, one or more steps of method 1300 may be performed by components of network 100 described with reference to FIGS. 1-11.

The method begins at step 1310, where a CQI index is received. In particular embodiments, radio network node 120 may receive a CQI index from wireless device 110. For example, wireless device 110 may determine the signal quality from radio network node 120 is good and may transmit a CQI index value of 14 to radio network node 120. The CQI index may be received via signaling or any other suitable communication method between wireless device 110 and radio network node 120. In particular embodiments, the CQI index comprises four bits.

At step 1312, the radio network node determines an MCS and TBS based at least in part on the received CQI index. For example, based on a received CQI index value of 14, radio network node 120 may determine an MCS value of 256QAM and a TBS index value of 27.

At step 1314, an MCS index is determined at least based on the determined MCS and an MCS table. In particular embodiments, the radio network node may look up an entry in a 256QAM MCS table based on the determined MCS. For example, radio network node 120 may look up an entry associated with a 256QAM MCS and a TBS index value of 27 in the 256QAM MCS table illustrated in FIG. 7. From the table, radio network node 120 may determine MCS index value 22 corresponds to a 256QAM MCS and a TBS index value of 27. In particular embodiments, the MCS index comprises five bits. Particular embodiments may use other MCS tables, such as the 256QAM MCS tables illustrated in FIGS. 9-11, or any other suitable MCS table.

Modifications, additions, or omissions may be made to method 1300. Additionally, one or more steps in method 1300 of FIG. 13A may be performed in parallel or in any suitable order.

FIG. 13B is a flowchart of an example method in a wireless device of determining an MCS and TBS, according to some embodiments. In particular embodiments, one or more steps of method 1350 may be performed by components of network 100 described with reference to FIGS. 1-11.

The method begins at step 1360, where an MCS index is received. In particular embodiments, wireless device 110 may receive an MCS index from radio network node 120. For example, wireless device 110 may receive an MCS index of 22 from network node 120. The MCS index may be received via signaling or any other suitable communication method between wireless device 110 and radio network node 120. In particular embodiments, the MCS index comprises five bits.

At step 1362, the wireless device identifies an entry in an MCS table based on the received MCS index. For example, wireless device 110 may identify the entry associated with index 22 in the 256QAM MCS table illustrated in FIG. 7. Particular embodiments may use other MCS tables, such as the 256QAM MCS tables illustrated in FIGS. 9-11, or any other suitable MCS table.

At step 1364, the wireless device determines an MCS and TBS index based on the identified entry in the MCS table. For example, from the identified entry wireless device 110 may determine MCS index value 22 corresponds to a 256QAM MCS and a TBS index value of 27.

Modifications, additions, or omissions may be made to method 1350. Additionally, one or more steps in method 1350 of FIG. 13B may be performed in parallel or in any suitable order.

Figure 14:
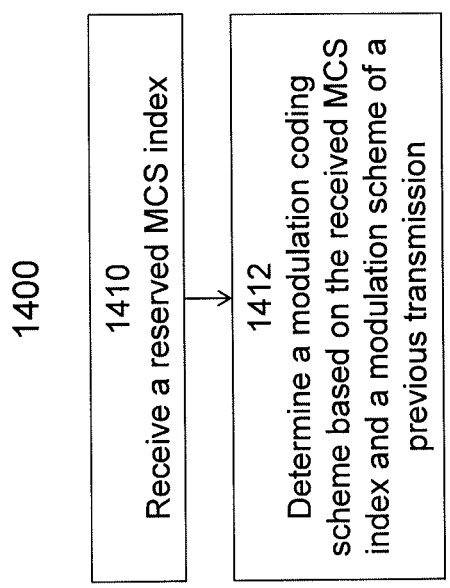
FIG. 14 is a flowchart of an example method of determining a retransmission modulation coding scheme in a wireless network, according to some embodiments.

FIG. 14 is a flowchart of an example method of determining a retransmission modulation coding scheme in a wireless network, according to some embodiments. In particular embodiments, one or more steps of method 1400 may be performed by components of network 100 described with reference to FIGS. 1-11.

The method begins at step 1410, where a radio network node receives an MCS index. In particular embodiments, receiving an MCS index may comprise receiving an MCS index from another process or module, such as a HARQ module, of the radio network node. In particular embodiments, the MCS index may be one of the reserved MCS indices, such as one of indices 29-31 described in reference to FIG. 7. For example, a HARQ module of radio network node 120 may determine it will retransmit a transport block. The HARQ module may communicate an MCS index for the retransmission to an encoding/decoding module of radio network node 120. The HARQ module and encoding/decoding module may be similar to those described in reference to FIG. 16 below.

At step 1412, the radio network node determines a modulation coding scheme based on the received MCS index and a modulation coding scheme of a previous transmission. In particular embodiments, the determination may be based on any of the example methods described above with respect to FIG. 7.

Modifications, additions, or omissions may be made to method 1400. Additionally, one or more steps in method 1400 of FIG. 14 may be performed in parallel or in any suitable order.

Figure 15:
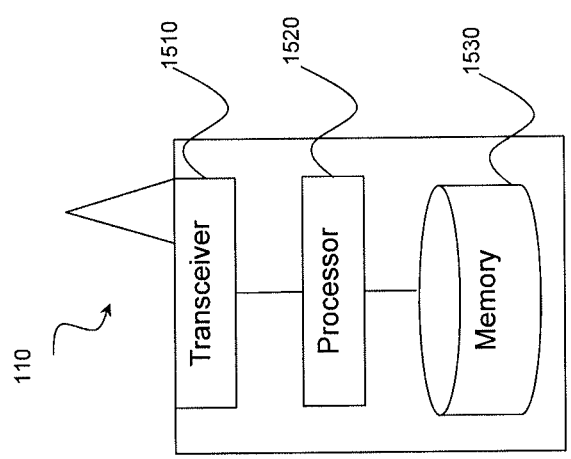
FIG. 15 is a block diagram illustrating an example embodiment of a wireless device.

FIG. 15 is a block diagram illustrating an example embodiment of a wireless device. The wireless device is an example of wireless device 110 illustrated in FIG. 3. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 1510, processor 1520, and memory 1530. In some embodiments, transceiver 1510 facilitates transmitting wireless signals to and receiving wireless signals from wireless radio network node 120 (e.g., via an antenna), processor 1520 executes instructions to provide some or all of the functionality described herein as provided by the wireless device, and memory 1530 stores the instructions executed by processor 1520.

Processor 1520 includes any suitable combination of hardware and software implemented in one or more integrated circuits or modules to execute instructions and manipulate data to perform some or all of the described functions of the wireless device. In some embodiments, processor 1520 may include, for example, one or more computers, one more programmable logic devices, one or more central processing units (CPUs), one or more microprocessors, one or more applications, and/or other logic, and/or any suitable combination of the preceding. Processor 1520 may include analog and/or digital circuitry configured to perform some or all of the described functions of wireless device 110. For example, processor 1520 may include resistors, capacitors, inductors, transistors, diodes, and/or any other suitable circuit components.

Memory 1530 is generally operable to store computer executable code and data. Examples of memory 1530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information. In particular embodiments, memory 1530 may store tables such as CQI, MCS, or TBS tables.

In particular embodiments, processor 1520 in communication with transceiver 1510 receives transport blocks from radio network node 120. Processor 1520 may perform demodulation and error correction on the received transport blocks. Other embodiments of the wireless device may include additional components (beyond those shown in FIG. 15) responsible for providing certain aspects of the wireless device's functionality, including any of the functionality described above and/or any additional functionality (including any functionality necessary to support the solution described above).

In particular embodiments, wireless device 110 may include an encoding/decoding module, a HARQ module, and a communication module. The encoding/decoding module may perform the processing functions of wireless device 110 related to encoding or decoding a transport block according to a particular modulation coding scheme. For example, the encoding/decoding module may encode a transmission block using QPSK, 16QAM, 64QAM, 256QAM or any other suitable MCS. The encoding/decoding module may also decode such a transmission block. In particular embodiments, the encoding/decoding module may use a CQI index and/or an MCS index when encoding/decoding. In certain embodiments, the encoding/decoding module may include or be included in processor 1520. The encoding/decoding module may include analog and/or digital circuitry configured to perform any of the functions of the encoding/decoding module and/or processor 1520.

The HARQ module may perform the processing functions of wireless device 110 related to error detection and correction for decoding a transport block. For example, the HARQ module may send ACK/NACK indicating whether decoding of transport block is successful/unsuccessful. Sending a NACK may cause radio network node 120 to retransmit a transport block. As another example, the HARQ module may combine redundancy versions of the same transport block for error correction. In certain embodiments, the HARQ module may include or be included in processor 1520. The encoding/decoding module may include analog and/or digital circuitry configured to perform any of the functions of the HARQ module and/or processor 1520.

The communication module may perform the transmit and receive functions of wireless device 110. For example, the communication module may receive a transmission block from radio network node 120. As another example, the communication module may receive/transmit configuration messages and/or signaling to/from radio network node 120 of network 100. The configuration messages may indicate support for 256QAM capabilities. The signaling may include CQI or MCS information. In certain embodiments, the communication module may include or be included in transceiver 1510. The communication module may include a transmitter and/or a transceiver. In certain embodiments, the communication module may include or be included in processor 1520. The communication module may include circuitry configured to wirelessly transmit messages and/or signals. In particular embodiments, the communication module may receive messages and/or signals for transmission to/from the encoding/decoding module or to/from the HARQ module.

Figure 16:
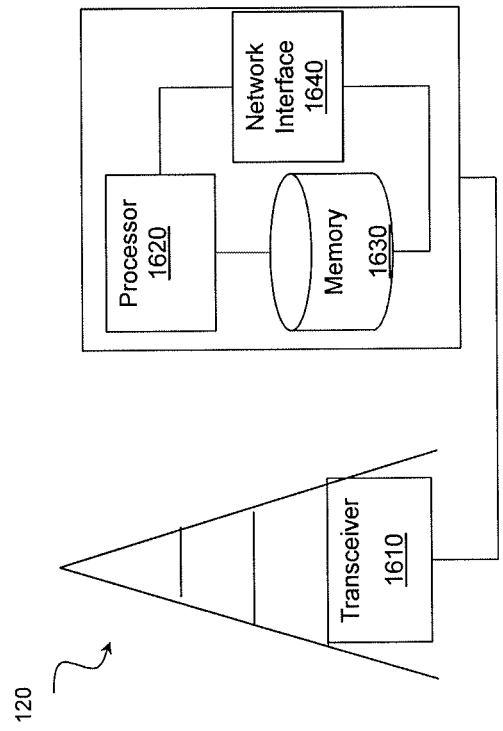
FIG. 16 is a block diagram illustrating an example embodiment of a radio network node.

FIG. 16 is a block diagram illustrating an example embodiment of a radio network node. Radio network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Radio network node 120 includes at least one transceiver 1610, at least one processor 1620, at least one memory 1630, and at least one network interface 1640. Transceiver 1610 facilitates transmitting wireless signals to and receiving wireless signals from a wireless device, such as wireless devices 110 (e.g., via an antenna); processor 1620 executes instructions to provide some or all of the functionality described above as being provided by a radio network node 120; memory 1630 stores the instructions executed by processor 1620; and network interface 1640 communicates signals to backend network components, such as a gateway, switch, router, Internet, Public Switched Telephone Network (PSTN), controller, and/or other network nodes 120. Processor 1620 and memory 1630 can be of the same types as described with respect to processor 1520 and memory 1530 of FIG. 15 above.

In some embodiments, network interface 1640 is communicatively coupled to processor 1620 and refers to any suitable device operable to receive input for radio network node 120, send output from radio network node 120, perform suitable processing of the input or output or both, communicate to other devices, or any combination of the preceding. Network interface 1640 includes appropriate hardware (e.g., port, modem, network interface card, etc.) and software, including protocol conversion and data processing capabilities, to communicate through a network.

In particular embodiments, processor 1620 in communication with transceiver 1610 transmits transport blocks to wireless device 110. The transport blocks may be modulated according to a particular MCS. In particular embodiments, processor 1620 in communication with transceiver 1610 transmits transport blocks, as described above, to wireless device 110.

Other embodiments of radio network node 120 include additional components (beyond those shown in FIG. 16) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

In particular embodiments, radio network node 120 may include an encoding/decoding module, a HARQ module, and a communication module. The encoding/decoding module may perform the processing functions of radio network node 120 related to encoding or decoding a transport block according to a particular modulation coding scheme. For example, the encoding/decoding module may encode a transmission block using QPSK, 16QAM, 64QAM, 256QAM or any other suitable MCS. The encoding/decoding module may also decode such a transmission block. The encoding/decoding module may determine MCS and TBS parameters based on table lookup. In certain embodiments, the encoding/decoding module may include or be included in processor 1620. The encoding/decoding module may include analog and/or digital circuitry configured to perform any of the functions of the encoding/decoding module and/or processor 1620.

The HARQ module may perform the processing functions of radio network node 120 related to error detection and correction for decoding a transport block. For example, the HARQ module may receive ACK/NACK indicating whether decoding of transport block is successful/unsuccessful. As another example, the HARQ module may transmit redundancy versions of the same transport block for error correction. In certain embodiments, the HARQ module may include or be included in processor 1620. The encoding/decoding module may include analog and/or digital circuitry configured to perform any of the functions of the HARQ module and/or processor 1620.

The communication module may perform the transmit and receive functions of radio network node 120. For example, the communication module may receive a transmission block from wireless device 110. As another example, the communication module may receive/transmit configuration messages and/or signaling to/from wireless device 110 of network 100. The configuration messages may indicate support for 256QAM capabilities. The signaling may include CQI or MCS information. In certain embodiments, the communication module may include or be included in transceiver 1610. The communication module may include a transmitter and/or a transceiver. In certain embodiments, the communication module may include or be included in processor 1620. The communication module may include circuitry configured to wirelessly transmit messages and/or signals. In particular embodiments, the communication module may receive messages and/or signals for transmission to/from the encoding/decoding module or to/from the HARQ module.

Some embodiments of the disclosure may provide one or more technical advantages. As an example, in some embodiments, the methods and apparatus disclosed herein may efficiently support 256QAM without increasing the size of existing CQI/MCS tables or compromising the link adaptation performance of existing modulation schemes.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
16QAM 16 Quadrature Amplitude Modulation
64QAM 64 Quadrature Amplitude Modulation
256QAM 256 Quadrature Amplitude Modulation
3GPP 3rd Generation Partnership Project
CP Cyclic Prefix
CQI Channel Quality Indicator
C-RNTI Cell Radio Network Temporary Identifier
CRS Cell-Specific Reference Signal
DCI Downlink Control Information
eNB Enhanced Node-B
FDD Frequency Division Duplex
LTE Long Term Evolution
MCS Modulation and Coding Scheme
OFDM Orthogonal Frequency-Division Multiplexing
PDCCH Physical Downlink Control Channel
PDSCH Physical Downlink Shared Channel
QPSK Quadrature Phase-Shift Keying
RE Resource Element
RB Resource Block
SNR Signal to Noise Ratio
SINR Signal to Interference and Noise Ratio
TDD Time Division Duplexing
UCI Uplink Control Information
UE User Equipment

The invention claimed is:

1. A method of determining a modulation coding scheme in a wireless network, the method comprising:
   receiving a channel quality indicator (CQI) index, wherein the CQI index comprises a four-bit value associated with a channel quality of a wireless signal;
   identifying an entry in a CQI table based on the CQI index, wherein the CQI table comprises:
      a first contiguous plurality of table entries associated with low SINR, each entry of the first contiguous plurality based on a first sampling grid; and
      a second contiguous plurality of table entries associated with medium SINR, each entry of the second contiguous plurality based on a second sampling grid, the second sampling grid having a smaller spacing than the first sampling grid; and
      a third contiguous plurality of table entries associated with high SINR, each entry of the third contiguous plurality based on a third sampling grid, the second sampling grid having a smaller spacing than the third sampling grid; and
   determining a modulation coding scheme based on the identified entry in the CQI table; and
   encoding a transport block according to the determined modulation coding scheme.

2. The method of claim 1, wherein:
   the first sampling grid comprises a grid spacing of approximately 3 dB;
   the second sampling grid comprises a grid spacing of approximately 2 dB; and
   the third sampling grid comprises a grid spacing of approximately 2.5 dB.

3. The method of claim 1, wherein:
   the first contiguous plurality of table entries comprises Quadrature Phase Shift Keying (QPSK) entries;
   the second contiguous plurality of table entries comprises 16 Quadrature Amplitude Modulation (16QAM) entries; and the third contiguous plurality of table entries comprises 64 Quadrature Amplitude Modulation (64QAM) entries and 256 Quadrature Amplitude Modulation (256QAM) entries.

4. The method of claim 1, wherein:
the first contiguous plurality of table entries comprises four entries;
the second contiguous plurality of table entries comprises three entries; and
the third contiguous plurality of table entries comprises eight entries.

5. The method of claim 1, wherein the third contiguous plurality of table entries comprises four 64QAM entries and four 256QAM entries.

6. A radio network node in a wireless network comprising a processor operable to:
receive a channel quality indicator (CQI) index, wherein the CQI index comprises a four-bit value associated with a channel quality of a wireless signal;
identify an entry in a CQI table based on the CQI index, wherein the CQI table comprises:
a first contiguous plurality of table entries associated with low SINR, each entry based on a first sampling grid;
a second contiguous plurality of table entries associated with medium SINR, each entry based on a second sampling grid; and
a third contiguous plurality of table entries associated with high SINR, each entry based on a third sampling grid;
determine a modulation coding scheme based on the identified entry in the CQI table; and
encode a transport block according to the determined modulation coding scheme.

7. The radio network node of claim 6, wherein:
the first sampling grid comprises a grid spacing of approximately 3 dB;
the second sampling grid comprises a grid spacing of approximately 2 dB; and
the third sampling grid comprises a grid spacing of approximately 2.5 dB.

8. The radio network node of claim 6, wherein:
the first contiguous plurality of table entries comprises Quadrature Phase Shift Keying (QPSK) entries;
the second contiguous plurality of table entries comprises 16 Quadrature Amplitude Modulation (16QAM) entries; and
the third contiguous plurality of table entries comprises 64 Quadrature Amplitude Modulation (64QAM) entries and 256 Quadrature Amplitude Modulation (256QAM) entries.

9. The radio network node of claim 6, wherein:
the first contiguous plurality of table entries comprises four entries;
the second contiguous plurality of table entries comprises three entries; and
the third contiguous plurality of table entries comprises eight entries.

10. The radio network node of claim 6, wherein the third contiguous plurality of table entries comprises four 64QAM entries and four 256QAM entries.

11. A method of determining a modulation coding scheme (MCS) index in a wireless network, the method comprising:
receiving a channel quality indicator (CQI) index, wherein the CQI index comprises a four-bit value associated with a channel quality of a wireless signal;
determining an MCS and a transport block size (TBS) based at least in part on the received CQI index;
identifying an entry in an MCS table based on the determined MCS, wherein the MCS table comprises:
a first contiguous plurality of table entries associated with low SINR, each entry of the first contiguous plurality based on a first sampling grid; and
a second contiguous plurality of table entries associated with medium SINR, each entry of the second contiguous plurality based on a second sampling grid, the second sampling grid having a smaller spacing than the first sampling grid; and
a third contiguous plurality of table entries associated with high SINR, each entry of the third contiguous plurality based on a third sampling grid, the second sampling grid having a smaller spacing than the third sampling grid; and
determining an MCS index, wherein the MCS index comprises a five-bit value associated with the identified entry in the MCS table.

12. The method of claim 11, wherein:
the first contiguous plurality of table entries comprises Quadrature Phase Shift Keying (QPSK) entries;
the second contiguous plurality of table entries comprises 16 Quadrature Amplitude Modulation (16QAM) entries; and
the third contiguous plurality of table entries comprises 64 Quadrature Amplitude Modulation (64QAM) entries and 256 Quadrature Amplitude Modulation (256QAM) entries.

13. The method of claim 11, wherein:
the first contiguous plurality of table entries comprises five entries;
the second contiguous plurality of table entries comprises seven entries; and
the third contiguous plurality of table entries comprises seventeen entries.

14. The method of claim 11, wherein the third contiguous plurality of table entries comprises nine 64QAM entries and eight 256QAM entries.

15. A radio network node in a wireless network, the radio network node comprising a processor operable to:
receive a channel quality indicator (CQI) index, wherein the CQI index comprises a four-bit value associated with a channel quality of a wireless signal;
determine an MCS and a transport block size (TBS) based at least in part on the received CQI index;
identify an entry in an MCS table based on the determined MCS, wherein the MCS table comprises:
a first contiguous plurality of table entries associated with low SINR, each entry of the first contiguous plurality based on a first sampling grid; and
a second contiguous plurality of table entries associated with medium SINR, each entry of the second contiguous plurality based on a second sampling grid, the second sampling grid having a smaller spacing than the first sampling grid; and
a third contiguous plurality of table entries associated with high SINR, each entry of the third contiguous plurality based on a third sampling grid, the second sampling grid having a smaller spacing than the third sampling grid; and
determine an MCS index, wherein the MCS index comprises a five-bit value associated with the identified entry in the MCS table.

16. The radio network node of claim 15, wherein:
the first contiguous plurality of table entries comprises Quadrature Phase Shift Keying (QPSK) entries;
the second contiguous plurality of table entries comprises 16 Quadrature Amplitude Modulation (16QAM) entries; and
the third contiguous plurality of table entries comprises 64 Quadrature Amplitude Modulation (64QAM) entries and 256 Quadrature Amplitude Modulation (256QAM) entries.

17. The radio network node of claim 15, wherein:
the first contiguous plurality of table entries comprises five entries;
the second contiguous plurality of table entries comprises seven entries; and
the third contiguous plurality of table entries comprises seventeen entries.

18. The wireless network element of claim 15, wherein the third contiguous plurality of table entries comprises nine 64QAM entries and eight 256QAM entries.

19. A method of determining a modulation coding scheme (MCS) in a wireless network, the method comprising:
receiving an MCS index, wherein the MCS index comprises a five-bit value associated with an entry in an MCS table;
identifying an entry in the MCS table based on the received MCS index, wherein the MCS table comprises:
a first contiguous plurality of table entries associated with low SINR, each entry of the first contiguous plurality based on a first sampling grid; and
a second contiguous plurality of table entries associated with medium SINR, each entry of the second contiguous plurality based on a second sampling grid, the second sampling grid having a smaller spacing than the first sampling grid; and
a third contiguous plurality of table entries associated with high SINR, each entry of the third contiguous plurality based on a third sampling grid, the second sampling grid having a smaller spacing than the third sampling grid; and
determining an MCS based on the identified entry in the MCS table.

20. The method of claim 19, wherein:
the first contiguous plurality of table entries comprises Quadrature Phase Shift Keying (QPSK) entries;
the second contiguous plurality of table entries comprises 16 Quadrature Amplitude Modulation (16QAM) entries; and
the third contiguous plurality of table entries comprises 64 Quadrature Amplitude Modulation (64QAM) entries and 256 Quadrature Amplitude Modulation (256QAM) entries.

21. The method of claim 19, wherein:
the first contiguous plurality of table entries comprises five entries;
the second contiguous plurality of table entries comprises seven entries; and
the third contiguous plurality of table entries comprises seventeen entries.

22. The method of claim 19, wherein the third contiguous plurality of table entries comprises nine 64QAM entries and eight 256QAM entries.

23. A wireless device in a wireless network, the wireless device comprising a processor operable to:
receive an MCS index, wherein the MCS index comprises a five-bit value associated with an entry in an MCS table;
identify an entry in the MCS table based on the received MCS index, wherein the MCS table comprises:
a first contiguous plurality of table entries associated with low SINR, each entry of the first contiguous plurality based on a first sampling grid; and
a second contiguous plurality of table entries associated with medium SINR, each entry of the second contiguous plurality based on a second sampling grid, the second sampling grid having a smaller spacing than the first sampling grid; and
a third contiguous plurality of table entries associated with high SINR, each entry of the third contiguous plurality based on a third sampling grid, the second sampling grid having a smaller spacing than the third sampling grid; and
determine an MCS based on the identified entry in the MCS table.

24. The wireless device of claim 23, wherein:
the first contiguous plurality of table entries comprises Quadrature Phase Shift Keying (QPSK) entries;
the second contiguous plurality of table entries comprises 16 Quadrature Amplitude Modulation (16QAM) entries; and
the third contiguous plurality of table entries comprises 64 Quadrature Amplitude Modulation (64QAM) entries and 256 Quadrature Amplitude Modulation (256QAM) entries.

25. The wireless device of claim 23, wherein:
the first contiguous plurality of table entries comprises five entries;
the second contiguous plurality of table entries comprises seven entries; and
the third contiguous plurality of table entries comprises seventeen entries.

26. The wireless device of claim 23, wherein the third contiguous plurality of table entries comprises nine 64QAM entries and eight 256QAM entries.

* * * * *